United States Patent
Tani

(10) Patent No.: US 10,308,276 B2
(45) Date of Patent: Jun. 4, 2019

(54) VARIABLE STEERING ANGLE STEERING DEVICE

(71) Applicant: NSK LTD., Tokyo (JP)

(72) Inventor: Hideyuki Tani, Maebashi (JP)

(73) Assignee: NSK LTD., Tokyo (JP)

( * ) Notice: Subject to any disclaimer, the term of this patent is extended or adjusted under 35 U.S.C. 154(b) by 96 days.

(21) Appl. No.: 15/508,276

(22) PCT Filed: Nov. 26, 2015

(86) PCT No.: PCT/JP2015/083244
§ 371 (c)(1),
(2) Date: Mar. 2, 2017

(87) PCT Pub. No.: WO2016/084899
PCT Pub. Date: Jun. 2, 2016

(65) Prior Publication Data
US 2017/0297609 A1    Oct. 19, 2017

(30) Foreign Application Priority Data

Nov. 28, 2014 (JP) ................................ 2014-241031

(51) Int. Cl.
*B62D 5/00* (2006.01)
*B62D 1/19* (2006.01)
(Continued)

(52) U.S. Cl.
CPC ............ *B62D 5/008* (2013.01); *B60R 25/021* (2013.01); *B62D 1/195* (2013.01); *B62D 1/197* (2013.01); *B62D 5/04* (2013.01)

(58) Field of Classification Search
CPC ........ B62D 5/008; B62D 1/195; B62D 1/197; B62D 5/04; B60R 25/021
(Continued)

(56) References Cited

U.S. PATENT DOCUMENTS

| | | | | |
|---|---|---|---|---|
| 5,236,335 A | * | 8/1993 | Takeuchi | B62D 5/001 180/404 |
| 6,655,709 B2 | * | 12/2003 | Sherwin | B62D 1/163 280/402 |

(Continued)

FOREIGN PATENT DOCUMENTS

| | | |
|---|---|---|
| CN | 101765533 A | 6/2010 |
| CN | 102099238 A | 6/2011 |

(Continued)

OTHER PUBLICATIONS

Communication dated Dec. 14, 2017, issued by the European Patent Office in counterpart European Patent Application No. 15863018.6.
(Continued)

*Primary Examiner* — Jacob D Knutson
(74) *Attorney, Agent, or Firm* — Sughrue Mion, PLLC

(57) ABSTRACT

A variable steering angle steering device rotationally drives a rotational element using a steering angle ratio adjustment motor so as to change the relationship between the amount of rotation of a first rotating shaft and the amount of rotation of a second rotating shaft, thereby changing the relationship between the amount of steering of the steering wheel and the amount of change in steering angle. The steering angle ratio adjustment motor is supported and fixed at a part of a steering column forward than a portion at which the steering column is supported with respect to a support frame. In the event of primary collision, the steering angle ratio adjustment motor collides with the support frame and is thereby prevented from being displaced rearward beyond the support frame.

9 Claims, 11 Drawing Sheets

(51) Int. Cl.
*B60R 25/021* (2013.01)
*B62D 5/04* (2006.01)

(58) Field of Classification Search
USPC .................................. 180/443, 444, 446
See application file for complete search history.

(56) References Cited

U.S. PATENT DOCUMENTS

| | | | |
|---|---|---|---|
| 7,568,989 B2 * | 8/2009 | Naka ................... | B62D 5/008 475/28 |
| 8,554,413 B2 * | 10/2013 | Mukai .................. | B62D 5/008 701/41 |
| 2007/0017734 A1 * | 1/2007 | Sherwin ................ | B62D 6/008 180/446 |
| 2008/0023251 A1 * | 1/2008 | Inaguma .............. | B62D 5/008 180/400 |
| 2010/0170364 A1 | 7/2010 | Bertet et al. | |
| 2011/0210536 A1 | 9/2011 | Monteil et al. | |
| 2011/0278828 A1 | 11/2011 | Klos et al. | |
| 2011/0313620 A1 * | 12/2011 | Mukai ................... | B62D 5/008 701/41 |
| 2012/0186384 A1 | 7/2012 | Minamigata et al. | |
| 2014/0158454 A1 * | 6/2014 | Kikuta ................... | B21D 53/88 180/443 |
| 2015/0232118 A1 * | 8/2015 | Yamamoto ............ | B62D 1/195 74/493 |

FOREIGN PATENT DOCUMENTS

| | | | |
|---|---|---|---|
| CN | 102267485 | A | 12/2011 |
| JP | 5-105103 | A | 4/1993 |
| JP | 10-287250 | A | 10/1998 |
| JP | 11-11329 | A | 1/1999 |
| JP | 11011329 | A * | 1/1999 |
| JP | 2000-168580 | A | 6/2000 |
| JP | 2000-211541 | A | 8/2000 |
| JP | 2002-240729 | A | 8/2002 |
| JP | 2004-9981 | A | 1/2004 |
| JP | 2006-15856 | A | 1/2006 |

OTHER PUBLICATIONS

Search Report dated Jan. 12, 2016, issued by the International Searching Authority in counterpart International Patent Application No. PCT/JP2015/083244 (PCT/ISA/210).
Written Opinion dated Jan. 12, 2016, issued by the International Searching Authority in counterpart International Patent Application No. PCT/JP2015/083244 (PCT/ISA/237).
Communication issued by the Japanese Patent Office dated Dec. 12, 2017 in counterpart Japanese Patent Application No. 2016-561945.
Communication dated Mar. 20, 2018, from the European Patent Office in counterpart European Application No. 15863018.6.
Communication dated Aug. 27, 2018, issued by the China National Intellectual Property Administration in counterpart Chinese Application No. 201580062337.8.

* cited by examiner

VARIABLE STEERING ANGLE STEERING DEVICE

TECHNICAL FIELD

The present invention relates to improvements on a variable steering angle type steering device capable of adjusting a relationship between an operation amount of a steering wheel and an amount of change in steering angle to be applied to steered wheels.

RELATED ART

As a steering device for applying a steering angle to steered wheels (normally, front wheels except for a special vehicle such as a forklift), a structure as shown in FIG. 11 has been widely known. In the steering device, a cylindrical steering column 2 is supported to a vehicle body 1, and a steering shaft 3 is rotatably supported to an inner diameter-side of the steering column 2. A steering wheel 4 is fixed to a rear end part of the steering shaft 3, which more protrudes rearward than a rear end opening of the steering column 2. When the steering wheel 4 is rotated, the rotation is transmitted to an input shaft 8 of a steering gear unit 7 via the steering shaft 3, a universal joint 5a, an intermediate shaft 6 and a universal joint 5b. When the input shaft 8 is rotated, a pair of tie-rods 9, 9 disposed at both sides of the steering gear unit 7 is pushed and pulled, so that a pair of left and right steered wheels is applied with a steering angle corresponding to an operation amount of the steering wheel 4. Meanwhile, in the shown example, the steering device is configured as a column assist-type electric power steering device configured to apply an auxiliary force, which corresponds to a force applied to the steering wheel 4 by a driver, to the steering shaft 3 by an electric motor 10.

Also, a variable steering angle type steering device configured to change a relationship between an amount of steering of the steering wheel and an amount of change in steering angle of the steered wheels in accordance with a traveling state of a vehicle, a driving state and the like has been known and implemented. As the variable steering angle type steering device, Patent Documents 1 to 4 disclose a structure where a differential transmission is incorporated into the steering device and a rotational element of the differential transmission is rotated by a driving source (generally, a separate driving source from a driving source configuring the power steering device) such as an electric motor, thereby changing a relationship between an amount of steering and an amount of change in steering angle. In the structure of Patent Documents 1 and 2, a planetary gear-type transmission is used as the differential transmission. Also, in the structure of Patent Documents 3 and 4, a wave gear-type transmission is used as the differential transmission.

When an automobile having the steering device mounted thereto causes a collision accident, upon so-called primary collision in which the automobile collides with another automobile or the like, a front part of a vehicle body gets crushed, so that a high rearward shock load is applied to a front end portion of the steering column 2. Therefore, for protection of a driver, it is important to prevent the steering column 2 from being displaced rearward nevertheless the shock load so that the steering wheel 4 is not displaced rearward (the steering wheel is not upthrusted toward a driver's body). For this reason, Patent Document 5 discloses a structure where an electric motor, which is an auxiliary power source of the column assist-type electric power steering device, is supported and fixed to a position forward than a pipe (a steering hanger beam) configured to support the steering column. In the meantime, the pipe is disposed in a width direction of the vehicle body with respect to the steering column. Also, an output shaft of the electric motor is disposed to be perpendicular to the width direction of the vehicle body and a central axis of the steering column. When an automobile having the steering device of Patent Document 5 mounted thereto causes a collision accident and the steering column is thus pushed rearward, the electric motor collides with the pipe, so that the steering column and the steering wheel are prevented from being displaced rearward beyond the pipe. However, the structure of Patent Document 5 is limited to the column assist-type electric power steering device. In a relatively large-sized vehicle of normal automobiles, a pinion assist-type or rack assist-type electric power steering device capable of applying a relatively higher auxiliary force than the column assist type is frequently adopted.

CITATION LIST

Patent Documents

Patent Document 1: Japanese Patent Application Publication No. H10-287250A
Patent Document 2: Japanese Patent Application Publication No. 2002-240729A
Patent Document 3: Japanese Patent Application Publication No. 2000-211541A
Patent Document 4: Japanese Patent Application Publication No. 2004-9981A
Patent Document 5: Japanese Patent Application Publication No. H11-11329A

SUMMARY OF THE INVENTION

Problems to be Solved

The present invention has been made in view of the above situations, and is to implement a variable steering angle type steering device capable of preventing a steering wheel from being upthrusted toward a driver's body upon collision accident without being limited to a stnicture where a column assist-type electric power steering device is mounted.

Means for Solving the Problems

A variable steering angle type steering device of the present invention has a steering column, a first rotating shaft, a second rotating shaft, a transmission and a steering angle ratio adjustment motor.

The steering column has a cylindrical shape and is supported to a support frame disposed in a width direction of a vehicle body.

The first rotating shaft is rotatably supported in the steering column and is configured to be rotated by a steering wheel fixed to a rear end portion of the first rotating shaft.

The second rotating shaft is provided concentrically with the first rotating shaft and is configured to apply a steering angle to steered wheels in association with rotation.

The transmission is a differential transmission provided between the first rotating shaft and the second rotating shaft and configured to connect the first rotating shaft and the second rotating shaft so that a rotating force can be transmitted. For example, the transmission is configured by a planetary gear-type transmission, a wave gear-type transmission, a ball-type transmission or the like.

The steering angle ratio adjustment motor is supported and fixed with respect to the steering column and is provided to rotate a rotational element (for example, a carrier of the planetary gear-type transmission, a wave generator configuring the wave gear-type transmission, a rotational member of the ball-type transmission) configuring the transmission.

The rotational element is rotated by the steering angle ratio adjustment motor, so that a relationship between an amount of rotation of the first rotating shaft and an amount of rotation of the second rotating shaft is changed. Thereby, a relationship (a steering angle ratio) between an amount of steering of the steering wheel and an amount of change in steering angle is changed.

Particularly, in the variable steering angle type steering device of the present invention, the steering angle ratio adjustment motor is supported and fixed to a part of the steering column forward than a part at which the steering column is supported to the support frame. Upon primary collision, the steering angle ratio adjustment motor collides with the support frame, and thus, is prevented from being displaced rearward beyond the support frame.

An output shaft of the steering angle ratio adjustment motor may be disposed to be perpendicular to the width direction of the vehicle body and an axial direction of a central axis of the steering column.

An acute angle θ between the output shaft of the steering angle ratio adjustment motor and the width direction of the vehicle body may satisfy a relation of $0° \leq \theta < 90°$.

The variable steering angle type steering device may further have an auxiliary force applying device configured to apply an auxiliary force, which is the same direction as a force to be applied from the steering wheel, to the second rotating shaft or a member (for example, a pinion shaft and a rack shaft configuring the steering gear unit) configured to be displaced in association with the rotation of the second rotating shaft. The auxiliary force applying device is provided at a part forward than the steering angle ratio adjustment motor.

The auxiliary force applying device is configured to have an auxiliary force applying motor. The auxiliary force applying motor may be supported and fixed to a part of the steering column forward than a part at which the steering angle ratio adjustment motor is supported and fixed. Upon the primary collision, when the auxiliary force applying motor tends to be further displaced rearward at a state where the steering angle ratio adjustment motor collides with the support frame, the auxiliary force applying motor collides with the steering angle ratio adjustment motor.

An output shaft of the auxiliary force applying device and the output shaft of the steering angle ratio adjustment motor may be parallel with each other.

The steering angle ratio adjustment motor and the auxiliary force applying motor may be supported and fixed to a same side of the steering column with respect to the width direction.

An inclined surface part that is inclined in a rearward direction as it faces outward in the width direction (as it becomes distant from the steering column with respect to the width direction) may be provided at a part positioned at the side forward than the steering angle ratio adjustment motor and fixed with respect to the steering angle ratio adjustment motor.

A steering lock device configured to substantially prevent the first rotating shaft and the second rotating shaft from rotating at an inner diameter-side of the steering column upon operation may be further provided. An actuator configuring the steering lock device is supported and fixed to a part of the steering column, which is positioned at a part forward than the part at which the steering column is supported to the support frame and is the same side as the steering angle ratio adjustment motor with respect to the width direction. When one member of the steering angle ratio adjustment motor and the actuator tends to be further displaced rearward at a state where the other member of the steering angle ratio adjustment motor and the actuator collides with the support frame upon the primary collision, the one member collides with the other member.

Effects of the Invention

When a vehicle having the variable steering angle type steering device of the present invention configured as described above causes a collision accident, if a front part of the vehicle body gets crushed in association with the primary collision, a high rearward shock load is applied to a front end portion of the steering column, so that the steering angle ratio adjustment motor supported and fixed with respect to the steering column tends to be displaced rearward. Since the steering angle ratio adjustment motor collides with the support frame, the steering column is prevented from being displaced rearward beyond the support frame. As a result, the steering wheel supported to a rear end portion of the first rotating shaft rotatably supported to the inner diameter-side of the steering column is prevented from being upthrusted toward a driver's body, so that it is possible to protect the driver. In the meantime, the present invention can achieve the above effects, irrespective of a structure of an electric power steering device or irrespective of whether or not the electric power steering device.

DETAILED DESCRIPTION OF EMBODIMENT

[First Example of Embodiment]

Figure 1:
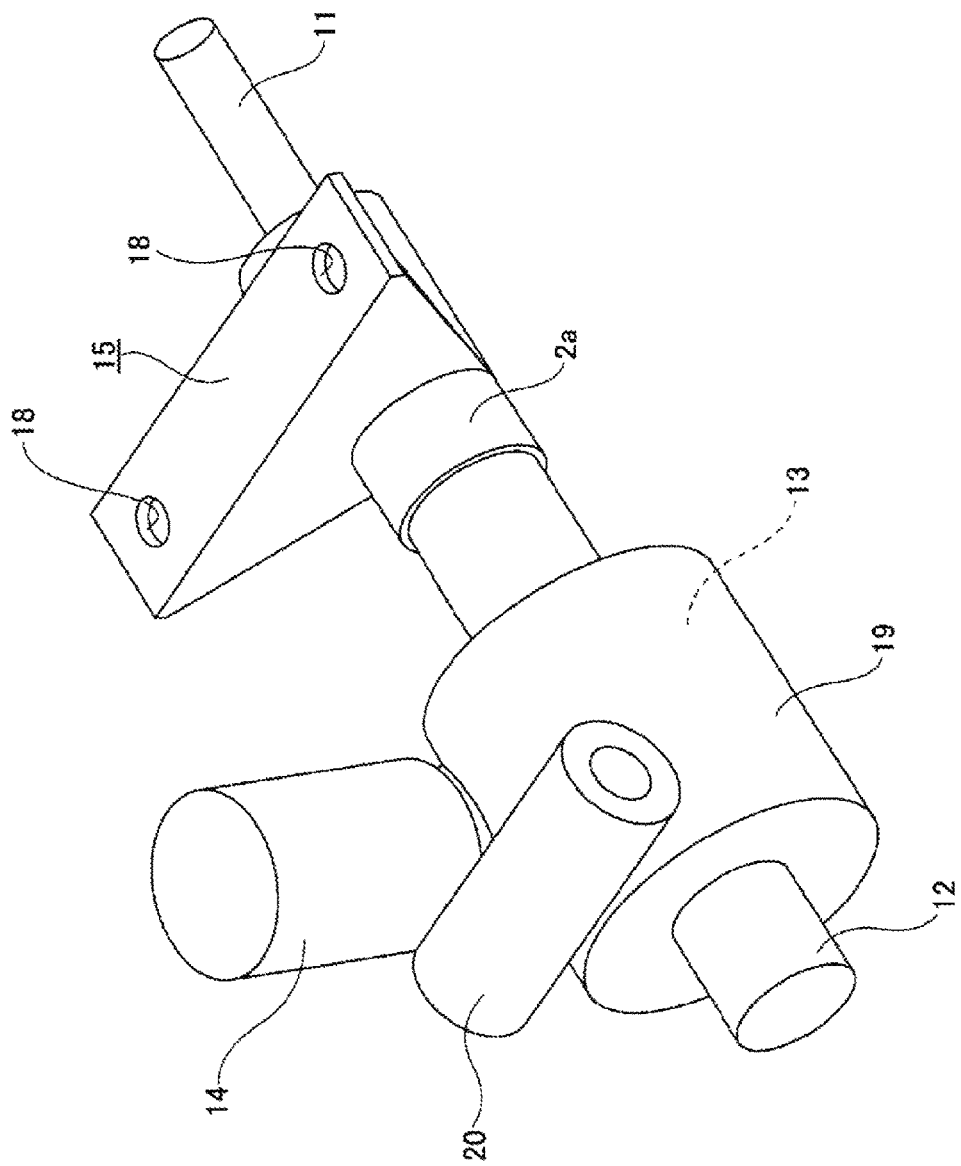
FIG. 1 is a perspective view pictorially depicting a variable steering angle type steering device of a first example of an embodiment.
Figure 2:
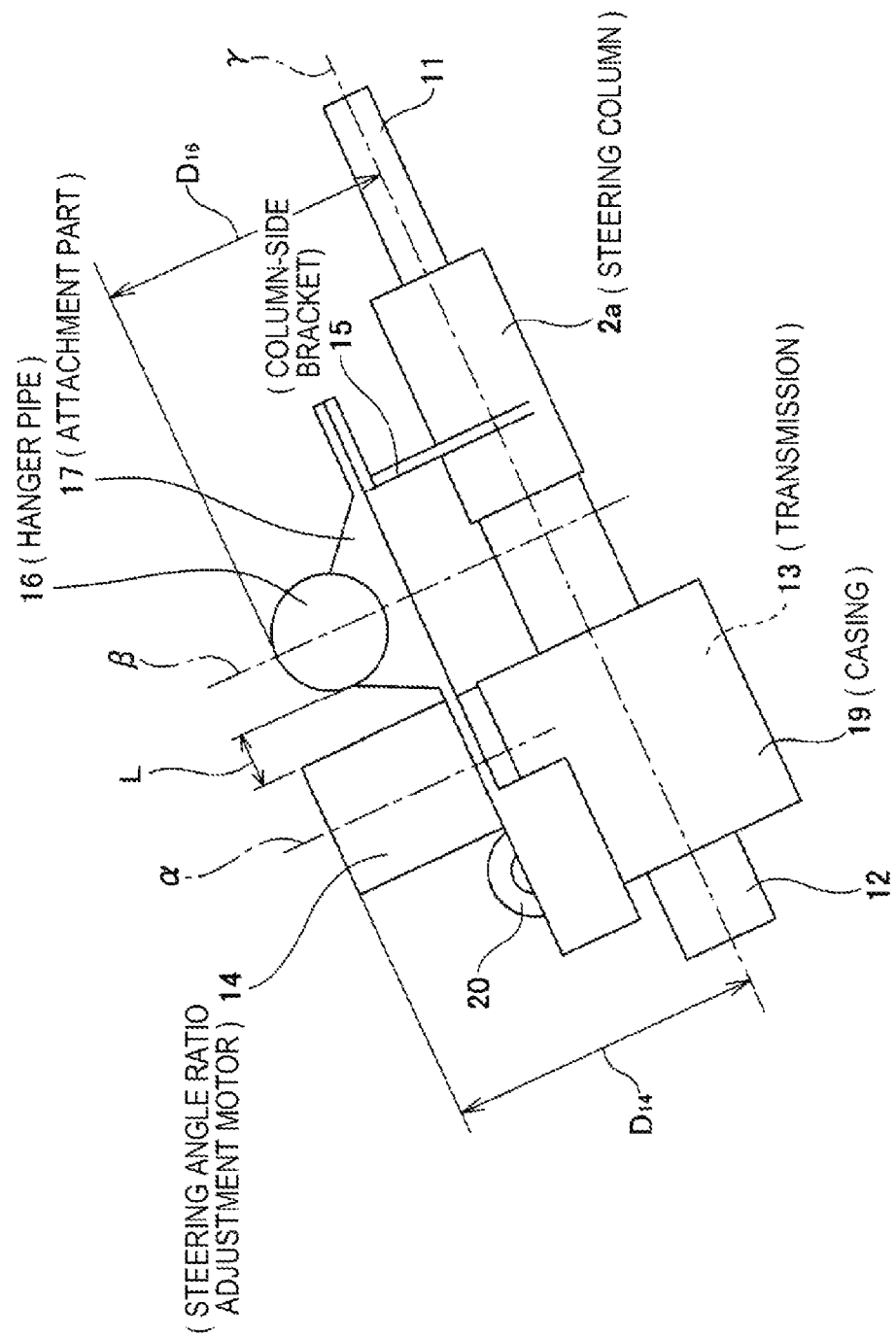
FIG. 2 is a side view pictorially depicting the variable steering angle type steering device of FIG. 1, which is supported with respect to a vehicle body.
Figure 11:
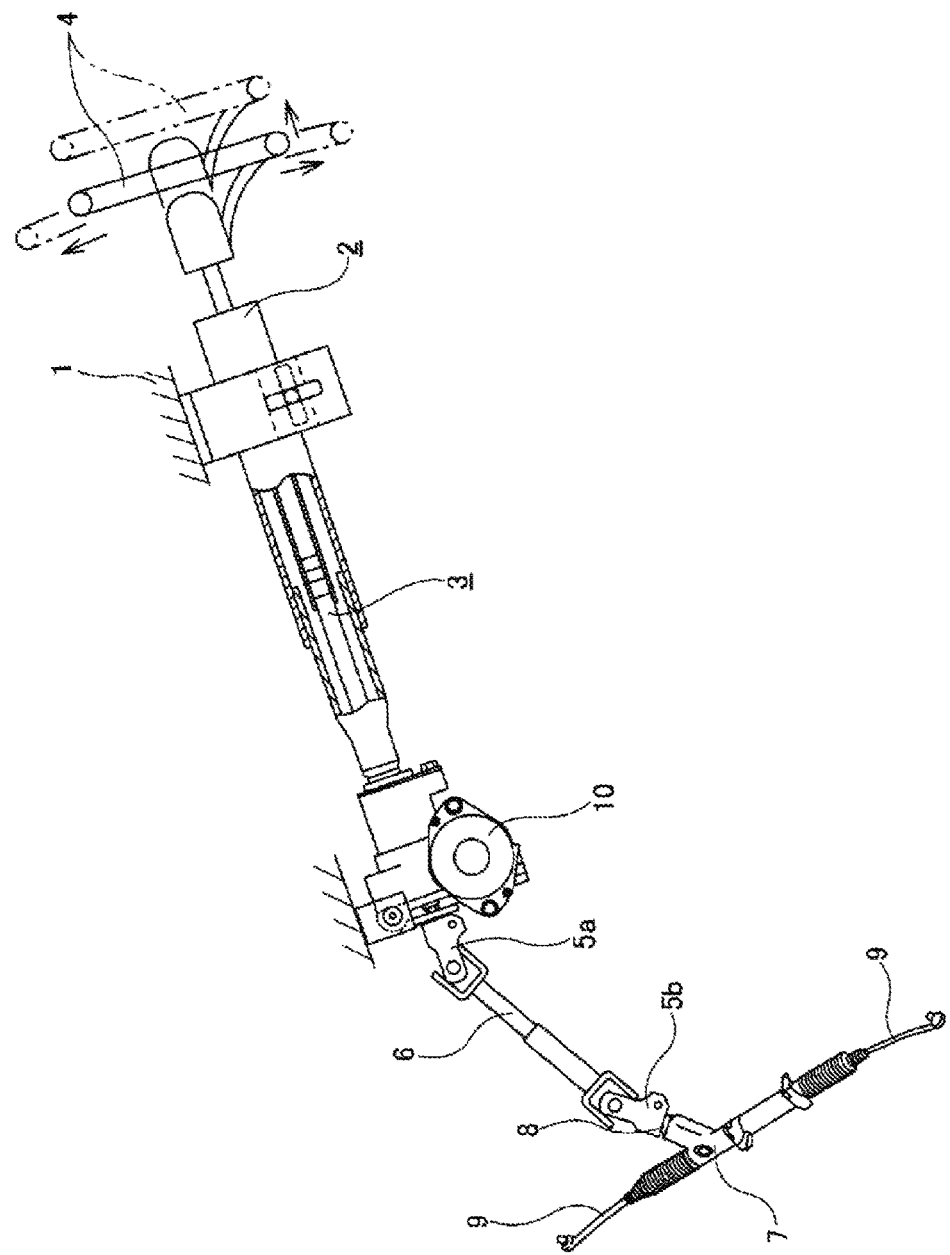
FIG. 11 is a partially cutout side view depicting an example of a steering device of the related art.

FIGS. 1 and 2 depict a first example of an embodiment of the present invention. A feature of a variable steering angle type steering device of the present invention including the first example is a structure of preventing a steering wheel 4 (refer to FIG. 11) from being upthrusted toward a driver's body upon collision accident.

The variable steering angle type steering device of the first example has a steering column 2a, an upper shaft 11 disposed at a rear side and corresponding to the first rotating shaft of the claims, a lower shaft 12 disposed at a front side and corresponding to the second rotating shaft of the claims, a differential transmission 13, and a steering angle ratio adjustment motor 14.

An intermediate part of the steering column 2a is supported and fixed with respect to an attachment part 17 of a hanger pipe (steering hanger beam) 16 via a column-side bracket 15. The hanger pipe 16 corresponds to the support frame of the claims. The column-side bracket 15 is formed by bending a metal plate having sufficient strength and stiffness such as a steel plate and is supported and fixed to the intermediate part of the steering column 2a by welding or the like. Also, the hanger pipe 16 is disposed in a width direction of a vehicle body, and both end portions in the width direction of the hanger pipe 16 are supported and fixed to both side parts (for example, a pair of left and right front pillars or the like) in the width direction of the vehicle body. The column-side bracket 15 is supported and fixed to the attachment part 17 of the hanger pipe 16 by bolts or studs (not shown) inserted into through-holes 18, 18 formed at two positions in the width direction of the column-side bracket 15. Therefore, in the first example, the steering column 2a is prevented from being displaced forward and rearward with respect to the vehicle body.

The upper shaft 11 is rotatably supported to an inner diameter-side of the steering column 2a. A steering wheel 4 is supported and fixed to a rear end portion of the upper shaft 11, which more protrudes rearward than a rear end opening of the steering column 2a. Therefore, the upper shaft 11 is configured to rotate in association with an operation of the steering wheel 4.

The lower shaft 12 is provided concentrically with the upper shaft 11 in front of the upper shaft 11. Therefore, rotation of the lower shaft 12 can be transmitted to an input shaft 8 of a steering gear unit 7 via a universal joint 5a, an intermediate shaft 6 and a universal joint 5b (refer to FIG. 11).

The transmission 13 is a differential transmission provided between the upper shaft 11 and the lower shaft 12 and configured to connect the upper shaft 11 and the lower shaft 12 so that a rotating force can be transmitted, and is configured by a planetary gear-type transmission, a wave gear-type transmission, a ball-type transmission or the like, for example. That is, the transmission 13 is configured to change the rotation of the upper shaft 11 with a predetermined change gear ratio and then to transmit the same to the lower shaft 12 (to change a relationship between an amount of rotation of the upper shaft 11 and an amount of rotation of the lower shaft 12). The change gear ratio of the transmission 13 is adjusted by rotating (by adjusting a rotating speed of a rotational element) a rotational element (for example, a carrier of the planetary gear-type transmission, a wave generator configuring the wave gear-type transmission, a rotational member of the ball-type transmission) configuring the transmission 13. The transmission 13 is accommodated in a casing 19 supported and fixed to a part close to a front end of the steering column 2a. Also, a lower bracket 20 is supported and fixed to a front upper surface of the casing 19. The lower bracket 20 is supported and fixed with respect to the attachment part 17 of the hanger pipe 16.

Also, the steering angle ratio adjustment motor 14, which is an electric motor, is to rotate the rotational element configuring the transmission 13. In the first example, the steering angle ratio adjustment motor 14 is supported and fixed with respect to the casing 19 of the transmission 13 so that a central axis (output shaft) $\alpha$ of the steering angle ratio adjustment motor 14 and a virtual line $\beta$ perpendicular to the central axis of the hanger pipe 16 and the central axis of the steering column 2a are parallel with each other. Therefore, the steering angle ratio adjustment motor 14 is supported and fixed to the steering column 2a via the casing 19.

Thereby, a distance (a distance in a direction of the central axis $\alpha$) $D_{14}$ between a virtual plane $\gamma$ perpendicular to the central axis $\alpha$ and the virtual line $\beta$ and including the central axis of the steering column 2a and an upper end portion of the steering angle ratio adjustment motor 14 is made greater than a distance $D_{16}$ between the virtual plane $\gamma$ and an upper end portion of the hanger pipe 16 ($D_{14}>D_{16}$). That is, the upper end portion-side of the steering angle ratio adjustment motor 14 more protrudes upward than the upper end portion of the hanger pipe 16 (it becomes distant from the virtual plane $\gamma$) on the basis of the virtual plane $\gamma$. In other words, at least a part of the steering angle ratio adjustment motor 14 and the hanger pipe 16 are configured to overlap with each other with respect to an axial direction of the central axis of the steering column 2a.

In the variable steering angle type steering device of the first example as described above, when the upper shaft 11 is rotated by an operation of the steering wheel 4, the rotation of the upper shaft 11 is transmitted to the lower shaft 12 via the transmission 13 (with being gear-changed by the transmission 13). Then, the rotation of the lower shaft 12 is transmitted to the input shaft 8 via the universal joint 5a, the intermediate shaft 6 and the universal joint 5b and a pair of tie-rods 9, 9 disposed at both sides of the steering gear unit 7 is pushed and pulled, so that a steering angle is applied to a pair of left and right steered wheels.

When a vehicle having the variable steering angle type steering device as described above causes a collision accident, if a front part of the vehicle body gets crushed in association with a primary collision, a high rearward shock load is applied to a front end portion of the steering column 2a or the member (the casing 19, the steering angle ratio adjustment motor 14 and the like) supported and fixed to the front end portion of the steering column 2a, so that the respective members 14, 19 tend to be displaced rearward. Then, the steering angle ratio adjustment motor 14 supported and fixed with respect to the front end portion of the steering column 2a (the casing 19 of the transmission 13 supported to the front end portion) collides with the hanger pipe 16, so that the steering column 2a is prevented from being displaced rearward beyond the hanger pipe. For this reason, it is possible to prevent the steering wheel 4, which is supported to the rear end portion of the upper shaft 11 rotatably supported to the inner diameter-side of the steering column 2a, from being displaced rearward (from being upthrusted toward the driver), so that it is possible to protect the driver. Also, since it is possible to appropriately maintain a positional relationship (the distance) between the steering wheel 4 and the driver's body, it is possible to sufficiently express a shock relieving effect of an airbag provided for the steering wheel 4. Also in this point, it is possible to protect the driver. In the meantime, as described above, from the standpoint of appropriately maintaining the positional relationship (the distance) between the steering wheel 4 and the driver's body after the primary collision, a distance L between the front end portion of the hanger pipe 16 and the rear end portion of the steering angle ratio adjustment motor 14 with respect to the axial direction of the central axis of the steering column 2a is determined as an appropriate value. That is, the distance L is a value that is to be appropriately determined depending on a vehicle type and the like, and can be set to 5 mm or greater, for example.

Also, the steering angle ratio adjustment motor 14 of the first example is supported with respect to the casing 19 so that the central axis α and the virtual line β perpendicular to the central axis of the hanger pipe 16 and the central axis of the steering column 2a are parallel with each other. For this reason, it is possible to make an angle (a distance in the width direction) small between a virtual line connecting the center of the steering angle ratio adjustment motor 14 and the central axis of the steering column 2a and an action direction of gravity and to suppress the moment about the central axis of the steering column 2a, which is to be applied to the steering column 2a due to the steering angle ratio adjustment motor 14. As a result, it is possible to suppress torsional stress, which is to be applied to a coupling part between the attachment part 17 of the hanger pipe 16 and the column-side bracket 15 and lower bracket 20, so that it is possible to save thicknesses and weights of the attachment part 17 and the column-side bracket 15 and lower bracket 20.

In the meantime, a shock absorption device for relieving shock, which is to be applied to the driver's body upon secondary collision, may be incorporated into the variable steering angle type steering device of the first example. That is, in the event of the collision accident, the primary collision is followed by the secondary collision where the driver's body collides with the steering wheel 4 (refer to FIG. 11). Therefore, the column-side bracket 15 supported and fixed to the intermediate part of the steering column 2a and the lower bracket 20 supported and fixed to (the casing 19 of the transmission 13 supported to) the front end portion of the steering column 2a are supported with respect to the attachment part 17 of the hanger pipe 16 so that they can be separated forward by the forward shock load associated with the secondary collision, and an energy absorption member configured to be plastically deformed and to thus absorb the shock load is provided between a part, which is to be displaced forward together with the steering column 2a, and the vehicle body. Alternatively, an entire length of the steering column 2a is configured to be contractible by fitting a rear part of a front inner column and a front end portion of a rear outer column so that they can be relatively displaced in the axial direction. Also, the upper shaft 11 is configured by combining an inner shaft and an outer tube so that torque can be transmitted and so that an entire length can be contractible when the high shock load is applied in the axial direction. Also, the column-side bracket 15 supported and fixed to an intermediate part of the outer column is supported with respect to the attachment part 17 of the hanger pipe 16 so that it can be separated forward by the forward shock load associated with the secondary collision, and an energy absorption member configured to be plastically deformed and to thus absorb the shock load is provided between the outer column and the vehicle body. In the structure as described above, upon the secondary collision, the outer column is displaced forward with reducing the entire length of the steering column, thereby absorbing the shock load. In the meantime, when a vehicle having the variable steering angle-type steering device for which a steering column configured by telescopically combining the inner column and the outer column is provided causes a collision accident and the high rearward shock load is applied to a front end portion of the steering column, the front inner column tends to be displaced rearward with reducing the entire length of the steering column 2a. Also in this case, when an amount of displacement of the inner column increases, the steering wheel 4 may be upthrusted toward the driver. Therefore, it is preferably to prevent the inner column from being displaced rearward upon the primary collision by supporting and fixing the steering angle ratio adjustment motor 14 to the inner column. Anyway, according to the variable steering angle type steering device of the first example, even when the collision accident occurs, it is possible to appropriately maintain the positional relationship between the steering wheel 4 and the driver's body, so that it is possible to easily design the shock absorption mechanism as described above.

Also, a tilt mechanism for adjusting a position in an upper-lower direction of the steering wheel 4 and a telescopic mechanism for adjusting a position in a front-rear direction thereof may be incorporated into the variable steering angle-type steering device of the first example.

When incorporating the tilt mechanism into the variable steering angle-type steering device, the lower bracket 20 is supported with respect to the vehicle body so that it can be pivotally displaced about a tilt shaft disposed in the width direction of the vehicle body. Further, the intermediate part of the steering column 2a is supported with respect to the attachment part 17 of the hanger pipe 16 so that a state where a position in the upper-lower direction thereof can be adjusted and a state where it can be maintained at the adjusted position can be switched.

Also, when incorporating the telescopic mechanism into the variable steering angle-type steering device, the steering column 2a is configured so that an entire length can be expandable and contractible by combining the inner column and the outer column. Further, the upper shaft is configured so that an entire length can be expandable and contractible by combining the inner shaft and the outer tube. Also, a column member of the inner column and the outer column, which is disposed at a rear side, is supported with respect to the attachment part 17 of the hanger pipe 16 so that a state where a position in the upper-lower direction thereof can be adjusted and a state where it can be maintained at the adjusted position can be switched.

[Second Example of Embodiment]

Figure 3:
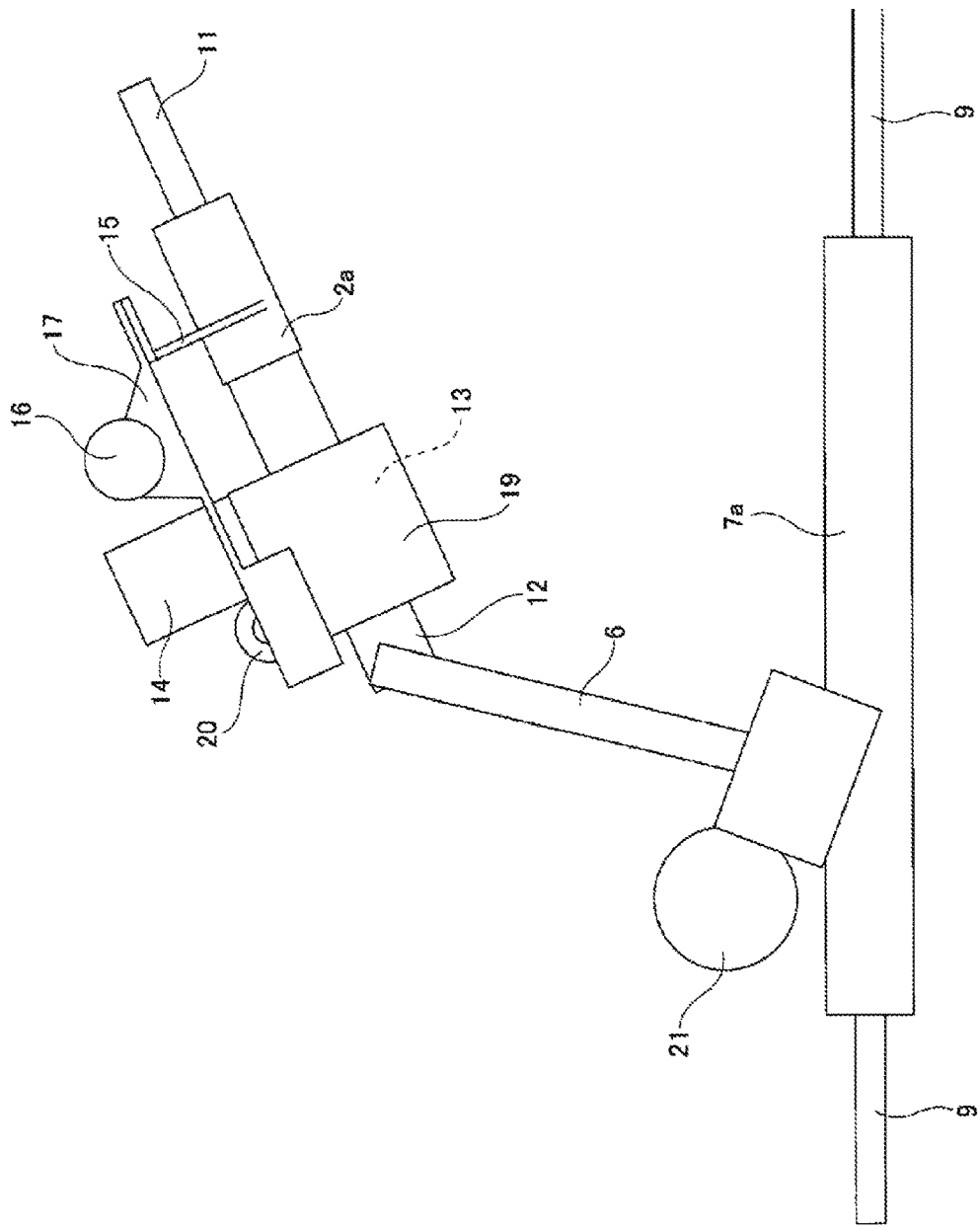
FIG. 3 is a pictorial view depicting the variable steering angle type steering device of a second example of the embodiment, which is supported with respect to the vehicle body.

FIG. 3 depicts a second example of the embodiment of the present invention. In the variable steering angle type steering device of the second example, an electric power steering device is incorporated. In the electric power steering device, it is intended to save a force necessary for operation of the steering wheel 4 (refer to FIG. 11) by using an auxiliary force applying motor 21 as an auxiliary power source. Also, the electric power steering device is a pinion assist type where the auxiliary power of the auxiliary force applying motor 21 is to be applied to a pinion shaft configuring the steering gear unit 7a. Since the pinion assist type can apply the higher auxiliary force than the column assist type shown in FIG. 11, it can be favorably applied to a relatively large-sized vehicle of the normal automobiles.

In the steering device where the pinion assist-type electric power steering device is incorporated, it is not possible to adopt a structure (for example, refer to the structure of Patent Document 5) where the electric motor (the auxiliary force applying motor), which is the auxiliary power source of the electric power steering device, collides with the hanger pipe 16 (refer to FIG. 2) upon the collision accident, so that the steering column is prevented from being displaced rearward. In contrast, according to the second example, the steering angle ratio adjustment motor 14 collides with the hanger pipe 16, so that the steering column 2a can be prevented from being displaced rearward. That is, even when the pinion assist-type electric power steering device is incorporated so as to obtain the high auxiliary force, it is possible to prevent the steering column 2a from being displaced rearward upon the collision accident.

The configurations and operations of the other parts are the same as the first example of the embodiment.

[Third Example of Embodiment]

Figure 4:
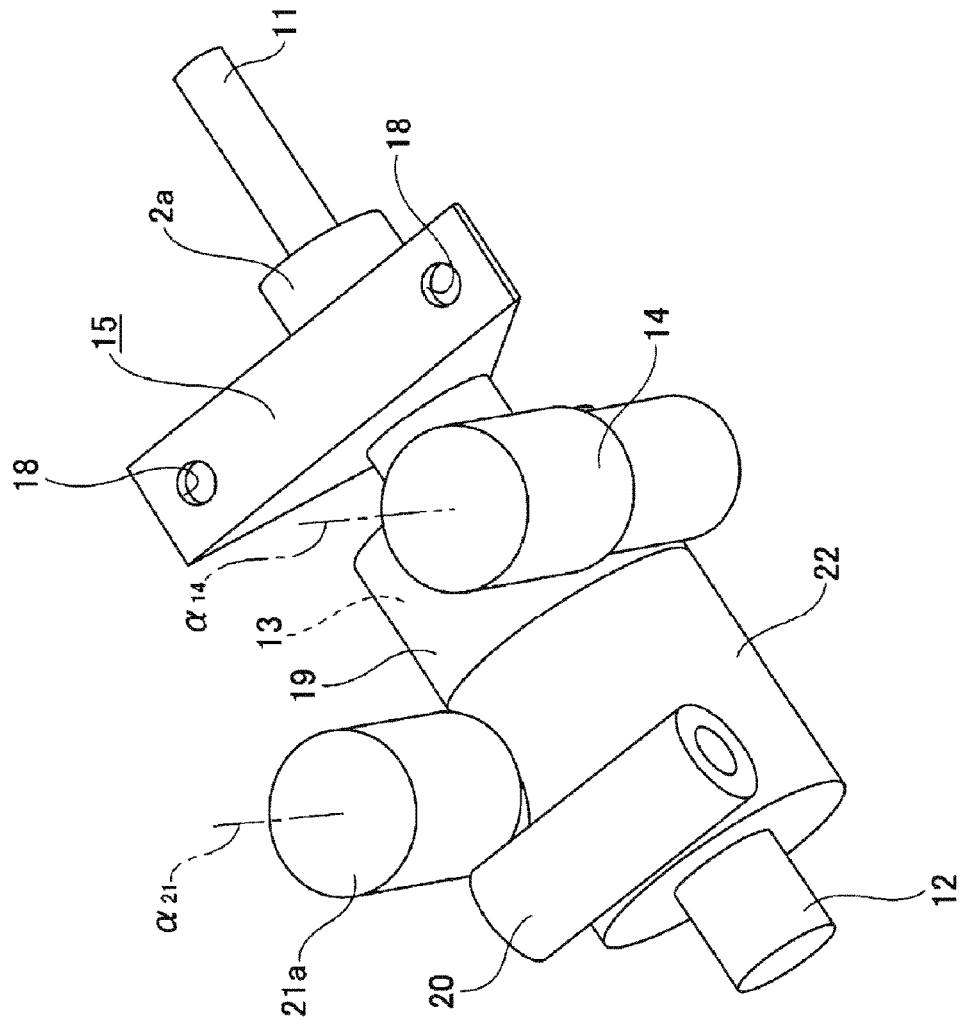
FIG. 4 is a perspective view pictorially depicting the variable steering angle type steering device of a third example of the embodiment.

FIG. 4 depicts a third example of the embodiment of the present invention. In the variable steering angle type steering device of the third example, a column assist-type electric power steering device configured to apply the auxiliary power of an auxiliary force applying motor 21a to the lower shaft 12 via a decelerator 22 is incorporated. In the third example, the decelerator 22 is supported and fixed to a front part of the casing 19 configured to accommodate therein the transmission 13. The auxiliary force applying motor 21a is supported and fixed with respect to the decelerator 22 at an opposite side to the side at which the steering angle ratio adjustment motor 14 is supported and fixed with respect to the casing 19, with respect to the width direction of the steering column 2a. Therefore, a direction of the moment about the central axis of the steering column 2a, which is to be applied to the steering column 2a due to the auxiliary force applying motor 21a, is opposite to a direction of the moment that is to be applied due to the steering angle ratio adjustment motor 14. Also, a central axis $\alpha_{21}$ of the auxiliary force applying motor 21a and a central axis $\alpha_{14}$ (a virtual line perpendicular to the central axis of the hanger pipe 16 and the central axis of the steering column 2a) of the steering angle ratio adjustment motor 14 are configured to be parallel with each other. For this reason, it is possible to further suppress the moment about the central axis of the steering column 2a, so that it is possible to further suppress the torsional stress, which is to be applied to the coupling part between the attachment part 17 of the hanger pipe 16 and the column-side bracket 15 and lower bracket 20.

The configurations and operations of the other parts are the same as the first example of the embodiment.

[Fourth Example of Embodiment]

Figure 5:
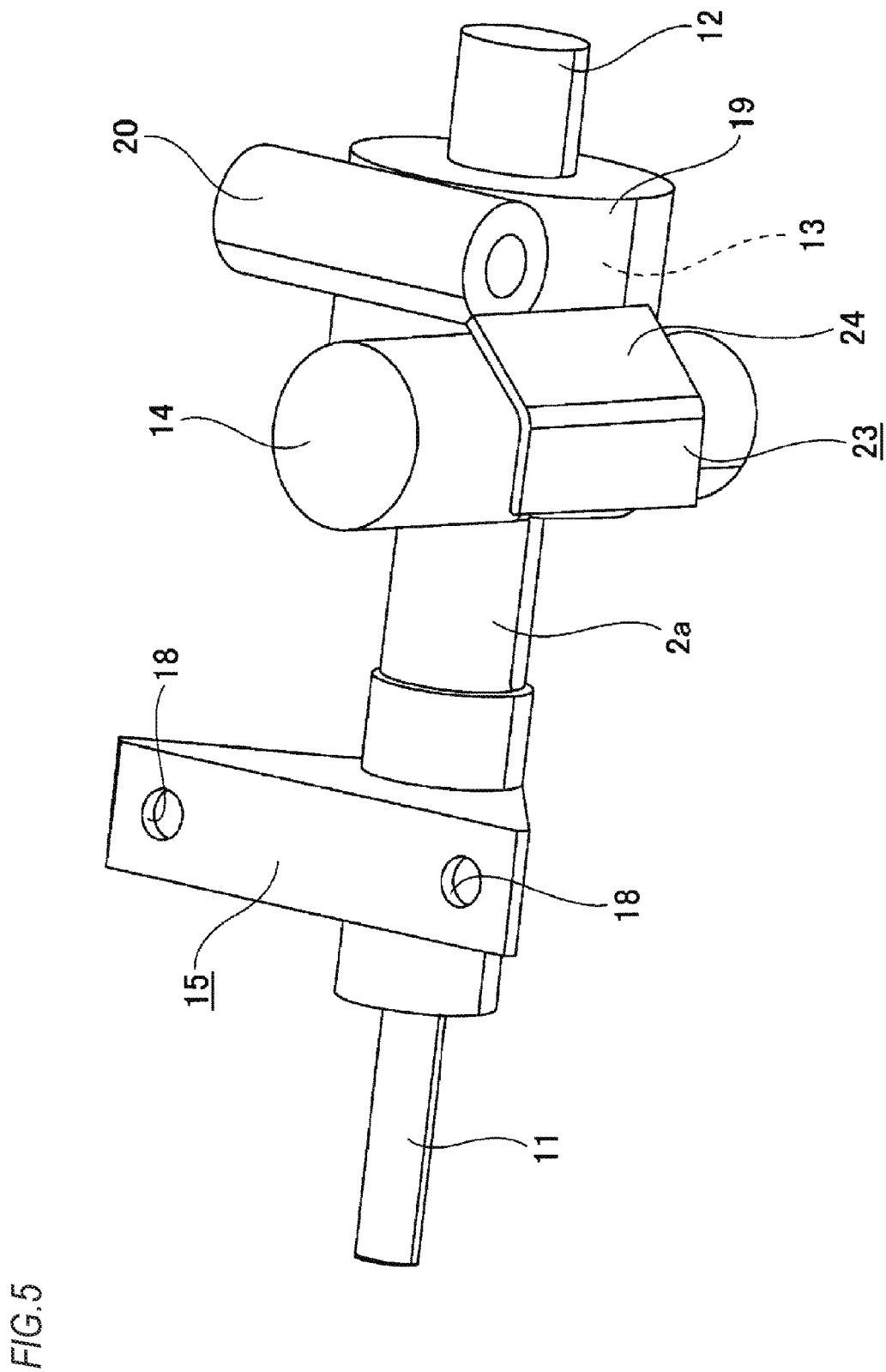
FIG. 5 is a perspective view pictorially depicting the variable steering angle type steering device of a fourth example of the embodiment.

FIG. 5 depicts a fourth example of the embodiment of the present invention. In the fourth example, a guide plate 23 formed by bending a metal plate such as a steel plate into a substantial L shape is supported and fixed to an outer part in the width direction of an outer peripheral surface of the steering angle ratio adjustment motor 14. Thereby, an inclined surface part 24 that is inclined in a rearward direction as it faces outward in the width direction (as it becomes distant from the steering column 2a) is provided at a side forward than the steering angle ratio adjustment motor 14. When a vehicle having the variable steering angle type steering device of the fourth example causes a collision accident, the front part of the vehicle body crushed and displaced rearward upon the primary collision is guided by the inclined surface part 24 and is moved outward in the width direction along the inclined surface part 24. Therefore, it is possible to suppress the rearward shock load that is to be applied to the steering angle ratio adjustment motor 14 upon the primary collision.

The configurations and operations of the other parts are the same as the first example of the embodiment.

[Fifth Example of Embodiment]

Figure 6:
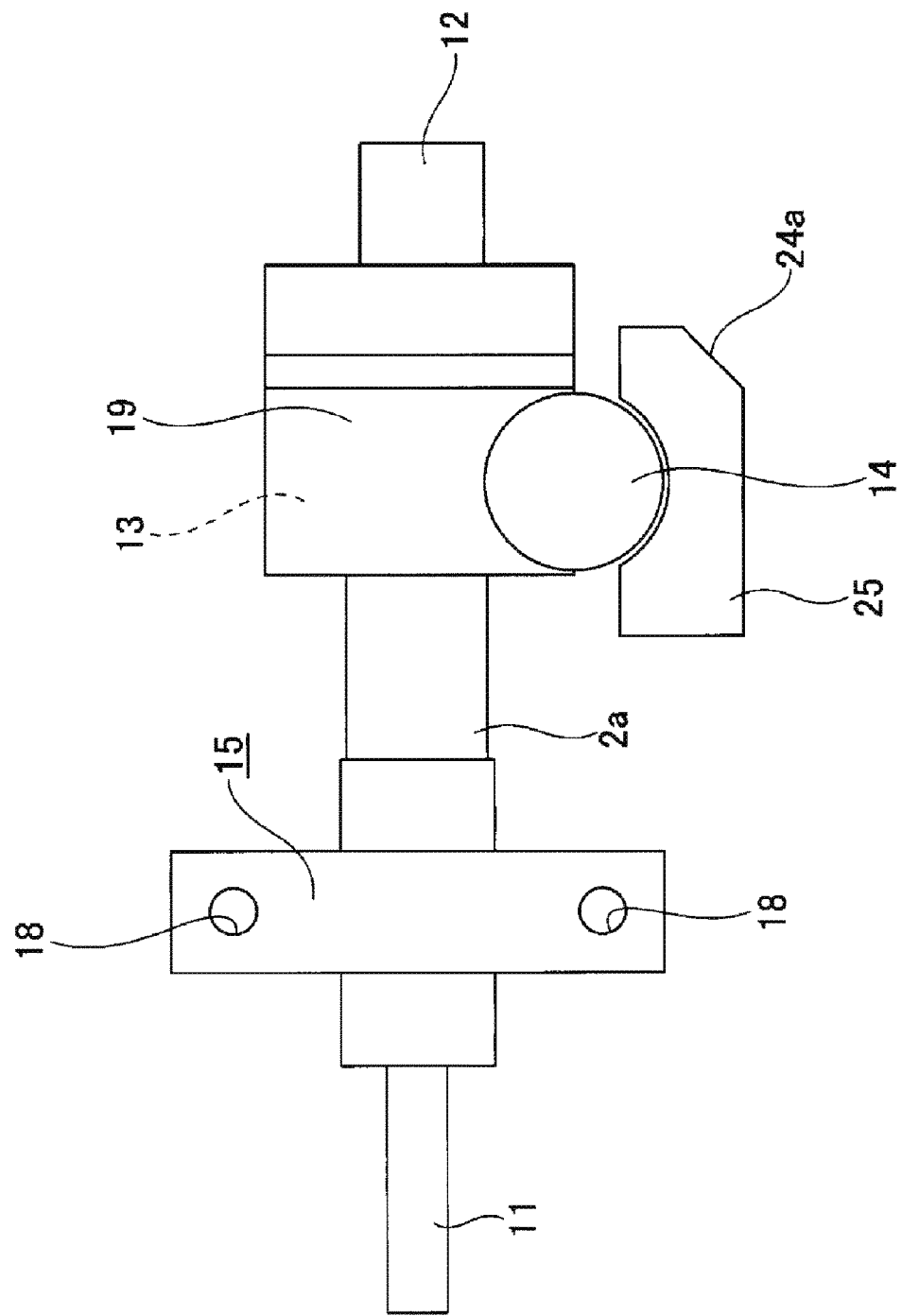
FIG. 6 is a perspective view pictorially depicting the variable steering angle type steering device of a fifth example of the embodiment.

FIG. 6 depicts a fifth example of the embodiment of the present invention. In the fifth example, a controller (ECU) 25 for controlling energization to the steering angle ratio adjustment motor 14 is supported and fixed to an outer part in the width direction of the outer peripheral surface of the steering angle ratio adjustment motor 14. An inclined surface part 24a that is inclined in a rearward direction as it faces outward in the width direction is provided at an outer half part in the width direction of a front end surface of the controller 25.

The configurations and operations of the other parts are the same as the first and fourth examples of the embodiment.

[Sixth Example of Embodiment]

Figure 7:
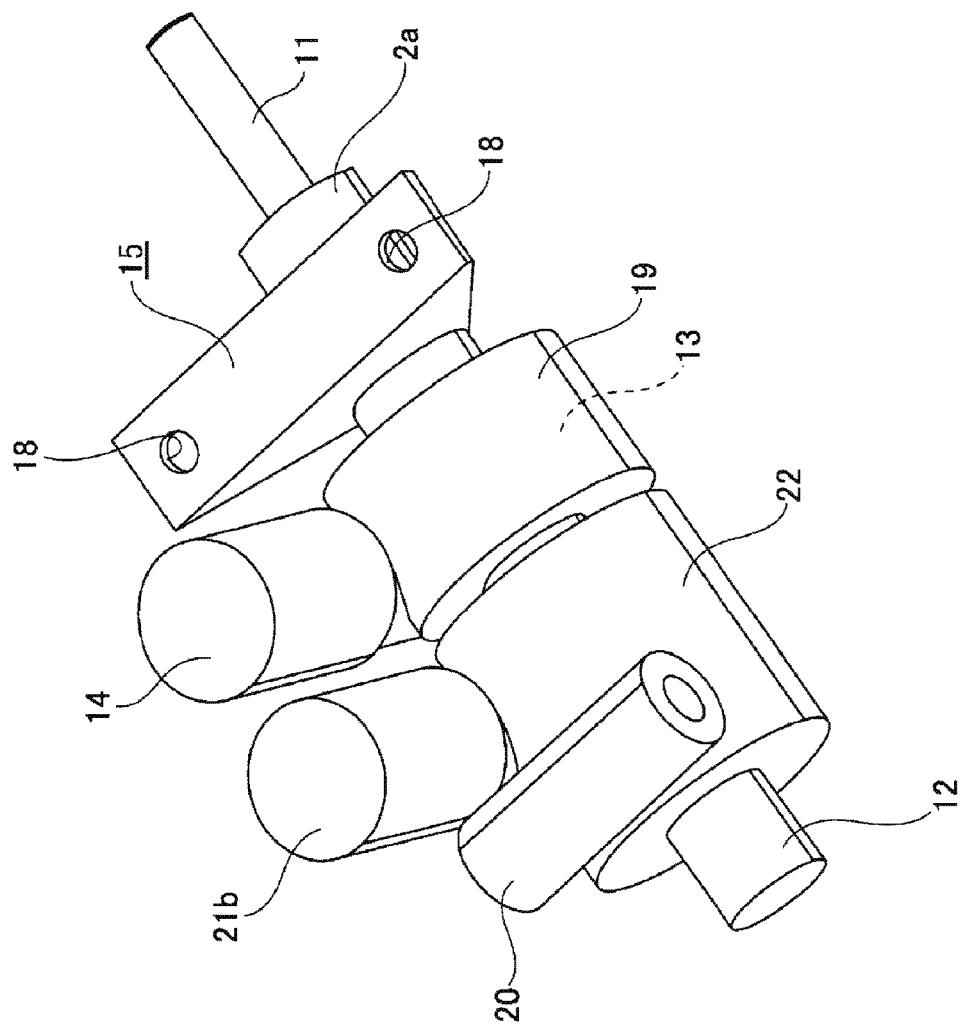
FIG. 7 is a perspective view pictorially depicting the variable steering angle type steering device of a sixth example of the embodiment.

FIG. 7 depicts a sixth example of the embodiment of the present invention. In the variable steering angle type steering device of the sixth example, a column assist-type electric power steering device configured to apply the auxiliary power of an auxiliary force applying motor 21b to the lower shaft 12 via the decelerator 22 is incorporated. The decelerator 22 is supported and fixed to the front part of the casing 19 configured to accommodate therein the transmission 13. The auxiliary force applying motor 21b is supported and fixed with respect to the decelerator 22 at the same side as the side at which the steering angle ratio adjustment motor 14 is supported and fixed with respect to the casing 19 configured to accommodate therein the transmission 13, with respect to the width direction of the steering column 2a. In other words, the auxiliary force applying motor 21b and the steering angle ratio adjustment motor 14 are provided with overlapping with each other in the axial direction of the central axis of the steering column 2a. Therefore, when the auxiliary force applying motor 21b tends to be further displaced rearward at a state where the steering angle ratio adjustment motor 14 collides with the hanger pipe 16 (refer to FIG. 2) upon the primary collision, the auxiliary force applying motor 21b collides with the steering angle ratio adjustment motor 14. As a result, the rearward displacement of the steering column 2a is prevented by an engagement part (contact part) between the integrated motors 14, 21b and the hanger pipe 16. That is, according to the sixth example, it is possible to dually configure the structure for preventing the steering column 2a from being displaced rearward upon the primary collision. Therefore, it is possible to further increase a force of preventing the steering column 2a from being displaced rearward beyond the hanger pipe at the state where the steering angle ratio adjustment motor 14 collides with the hanger pipe 16 (refer to FIG. 2). Also, when assembling the variable steering angle type steering device, it is possible to assemble the steering angle ratio adjustment motor 14 and the auxiliary force applying motor 21b without changing the direction of the variable steering angle type steering device, so that it is possible to save the manufacturing cost.

The configurations and operations of the other parts are the same as the first example of the embodiment.

[Seventh Example of Embodiment]

Figure 8:
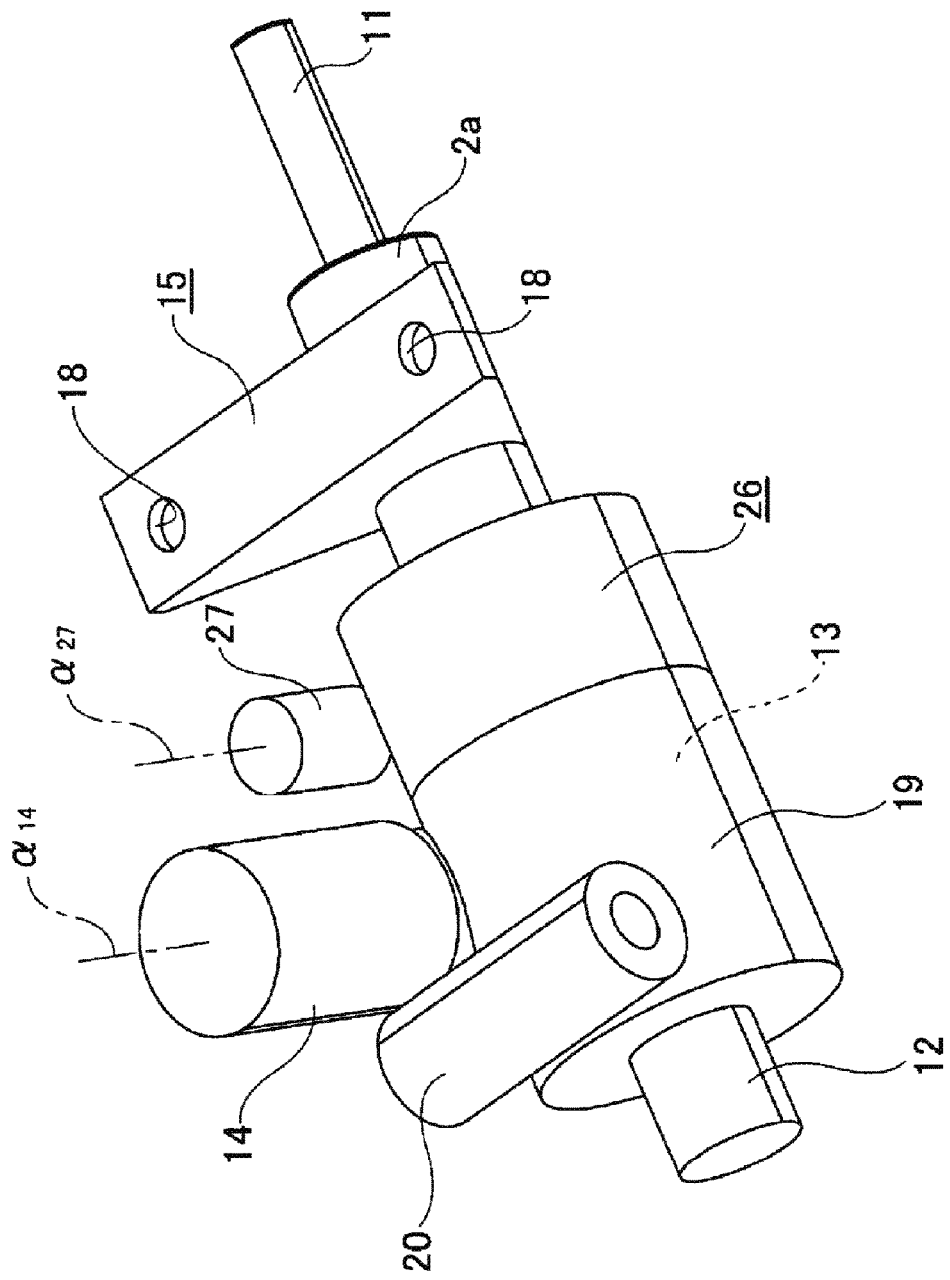
FIG. 8 is a perspective view pictorially depicting the variable steering angle type steering device of a seventh example of the embodiment.

FIG. 8 depicts a seventh example of the embodiment of the present invention. In the variable steering angle-type steering column of the seventh example, a steering lock device 26 for substantially preventing the upper shaft 11 from being rotated in the steering column 2a is incorporated.

The steering lock device 26 is provided at a part adjacent to the rear side of the transmission 13 around the steering column 2a. The steering lock device 26 has a through-hole (not shown) formed at the intermediate part of the steering column 2a, a key lock collar (not shown) having an engaging concave portion formed at least at one place in a circumferential direction, a locking pin (not shown) provided to be displaceable in the through-hole in a radial direction of the steering column 2a and a direct acting type actuator (solenoid) 27.

The key lock collar is externally fitted and fixed to a position of the upper shaft 11 at which a phase thereof coincides with the through-hole with respect to the axial direction. When the locking pin is displaced toward a radially inner side by the actuator 27 and a tip portion (a radially inner end portion) of the locking pin is engaged with the engaging concave portion, the rotation of the upper shaft 11 relative to the steering column 2a is substantially impossible. That is, when the steering wheel 4 (refer to FIG. 2) is rotated by a predetermined force or greater (exceeding a value defined by key lock regulation) with the engaging concave portion and the locking pin being engaged, the upper shaft 11 is rotated relative to the key lock collar. However, the upper shaft 11 is not rotated by a force of operating the steering wheel 4 at a normal driving posture so as to apply a desired steering angle to the steered wheels. In contrast, at a state where the locking pin is displaced outward in the radial direction by the actuator 27 and the engagement between the tip portion of the locking pin and the engaging concave portion is thus released, the rotation of the upper shaft 11 relative to the steering column 2a is possible.

In the seventh example, the actuator 27 is supported and fixed at the same side as the side at which the steering angle ratio adjustment motor 14 is supported and fixed with respect to the casing 19 configured to accommodate therein the transmission 13, with respect to the width direction of the steering column 2a. Herein, a central axis $\alpha_{27}$ of the actuator 27 and the central axis $\alpha_{14}$ of the steering angle ratio adjustment motor 14 are parallel with each other. In other words, the actuator 27 and the steering angle ratio adjustment motor 14 are provided with overlapping with each other in the axial direction of the central axis of the steering column 2a. For this reason, when a vehicle having the variable steering angle type steering device of the seventh example causes a collision accident, the steering column 2a is displaced rearward and the actuator 27 correspondingly collides with the hanger pipe 16. At this state, when the steering angle ratio adjustment motor 14 tends to be further displaced rearward, the steering angle ratio adjustment motor 14 collides with the actuator 27. As a result, the rearward displacement of the steering column 2a is prevented by the engagement part (contact part) between the integrated actuator 27 and steering angle ratio adjustment motor 14 and the hanger pipe 16. That is, according to the seventh example, it is possible to dually configure the structure for preventing the steering column 2a from being displaced rearward upon the primary collision. Also, when assembling the variable steering angle type steering device, it is possible to assemble the steering angle ratio adjustment motor 14 and the actuator 27 without changing the direction of the variable steering angle type steering device, so that it is possible to save the manufacturing cost.

The configurations and operations of the other parts are the same as the first and sixth examples of the embodiment.

[Eighth Example of Embodiment]

Figure 9:
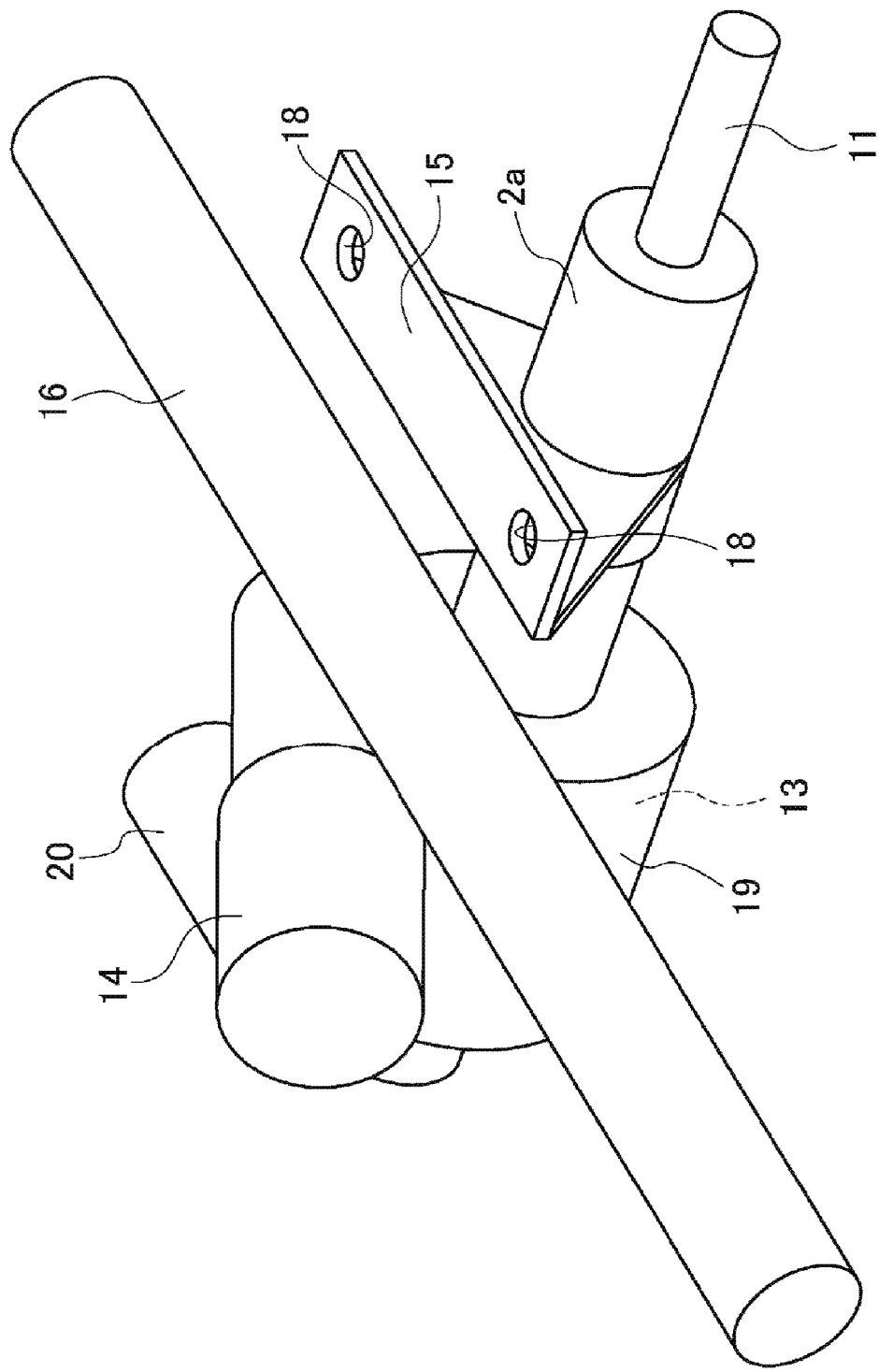
FIG. 9 is a perspective view pictorially depicting the variable steering angle type steering device of an eighth example of the embodiment.
Figure 10:
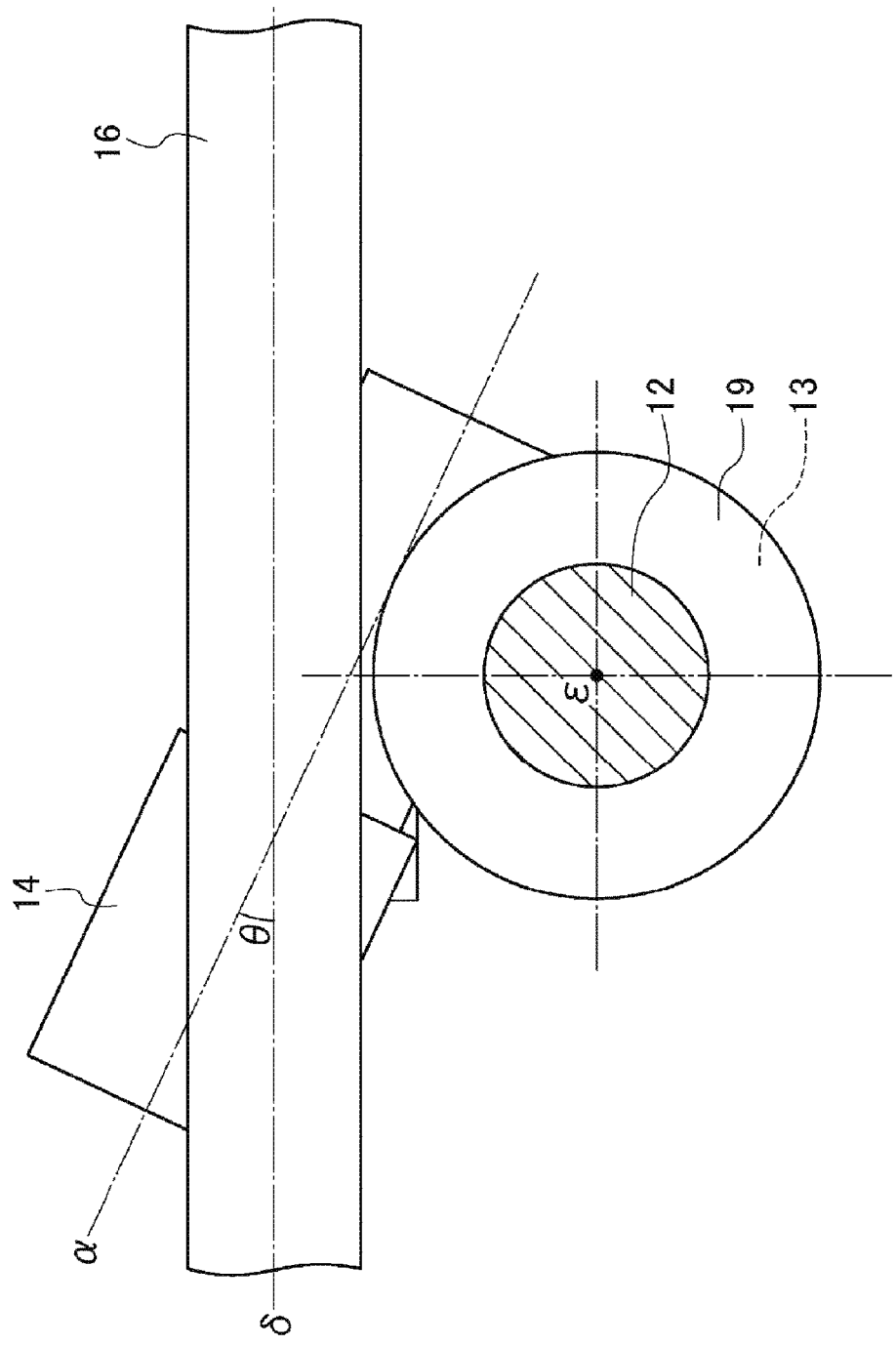
FIG. 10 depicts the variable steering angle type steering device of FIG. 9, as seen from an axial direction of a central axis of a steering column.

FIGS. 9 and 10 depict an eighth example of the embodiment of the present invention. In the eighth example, the central axis $\alpha$ of the steering angle ratio adjustment motor 14 and the virtual line $\beta$ (refer to FIG. 2) perpendicular to a central axis $\delta$ of the hanger pipe 16 and a central axis $\in$ of the steering column 2a are not disposed to be parallel with each other. That is, the central axis $\alpha$ of the steering angle ratio adjustment motor 14 is perpendicular to the central axis $\delta$ of the hanger pipe 16 and the central axis $\varepsilon$ of the steering column 2a in the above embodiment, but is not perpendicular in the eighth example.

More specifically, as shown in FIG. 10, when seen from the axial direction of the central axis $\varepsilon$ of the steering column 2a, an acute angle $\theta$ between the central axis $\alpha$ of the steering angle ratio adjustment motor 14 and the central axis $\delta$ of the hanger pipe 16 satisfies a relation of $0°\leq\theta<90°$. Herein, at least a part of the steering angle ratio adjustment motor 14 and the hanger pipe 16 overlap with each other in the axial direction of the central axis $\varepsilon$ of the steering column 2a.

In this way, the steering angle ratio adjustment motor 14 is obliquely disposed ($0°\leq\theta<90°$) relative to the hanger pipe 16 so as not to be a right angle ($\theta=90°$). Thereby, when seen from the axial direction of the central axis $\varepsilon$ of the steering column2a, it is possible to widen a region in which the steering angle ratio adjustment motor 14 and the hanger pipe 16 overlap with each other. Therefore, since the rearward displacement of the steering angle ratio adjustment motor 14 upon the primary collision is easily restricted by the hanger pipe 16, it is possible to prevent the steering column 2a and the steering wheel 4 from being displaced rearward, so that it is possible to protect the driver more securely.

The subject application is based on a Japanese Patent Application No. 2014-241031 filed on Nov. 28, 2014, which is herein incorporated by reference.

DESCRIPTION OF REFERENCE NUMERALS

1: vehicle body, 2, 2a: steering column, 3: steering shaft, 4: steering wheel, 5a, 5b: universal joint, 6: intermediate shaft, 7, 7a: steering gear unit, 8: input shaft, 9: tie-rod, 10: electric motor, 11: upper shaft, 12: lower shaft, 13: transmission, 14: steering angle ratio adjustment motor, 15: column-side bracket, 16: hanger pipe, 17: attachment part, 18: through-hole, 19: casing, 20: lower bracket, 21, 21a, 21b: auxiliary force applying motor, 22: decelerator, 23: guide plate, 24, 24a: inclined surface part, 25: controller, 26: steering lock device, 27: actuator

The invention claimed is:

1. A variable steering angle type steering comprising:
   a steering column which comprises a cylindrical shape and is supported to a support frame disposed in a width direction of a vehicle body;
   a first rotating shaft which is rotatably supported in the steering column and is configured to be rotated by a steering wheel fixed to a rear end portion of the first rotating shaft;
   a second rotating shaft which is provided concentrically with the first rotating shaft and is configured to apply a steering angle to steered wheels in association with rotation;
   a transmission which is a differential transmission provided between the first rotating shaft and the second rotating shaft and configured to connect the first rotating shaft and the second rotating shaft so that a rotating force can be transmitted; and a steering angle ratio adjustment motor which is supported and fixed with respect to the steering column and is provided to rotate a rotational element configuring the transmission, wherein the rotational element is rotated by the steering angle ratio adjustment motor, so that a relationship between an amount of rotation of the first rotating shaft and an amount of rotation of the second rotating shaft is changed, and a relationship between an amount of steering of the steering wheel and an amount of change in steering angle is changed, wherein the steering angle ratio adjustment motor is supported and fixed to a part of the steering column forward of a part at which the steering column is supported to the support frame, wherein upon primary collision, the steering angle ratio adjustment motor collides with the support frame, and the steering angle ratio adjustment motor is prevented from being displaced rearward beyond the support frame, wherein the variable steering angle type steering further comprises an auxiliary force applying device configured to apply an auxiliary force, which is in the same direction as a force to be applied from the steering wheel, to the second rotating shaft or a member configured to be displaced in association with the rotation of the second rotating shaft, wherein the auxiliary force applying device is provided at a part forward of the steering angle ratio adjustment motor, and wherein the auxiliary force applying device and the steering angle ratio adjustment motor overlap each other in the axial direction of the central axis of the steering column.

2. The variable steering angle type steering according to claim 1, wherein an output shaft of the steering angle ratio adjustment motor is disposed to be perpendicular to the width direction of the vehicle body and an axial direction of a central axis of the steering column.

3. The variable steering angle type steering according to claim 1, wherein an acute angle θ between an output shaft of the steering angle ratio adjustment motor and the width direction of the vehicle body satisfy a relation of $0°≤θ<90°$.

4. The variable steering angle type steering according to claim 1, wherein the auxiliary force applying device comprises an auxiliary force applying motor, wherein the auxiliary force applying motor is supported and fixed to a part of the steering column forward of a part at which the steering angle ratio adjustment motor is supported and fixed, and wherein upon the primary collision, when the auxiliary force applying motor tends to be further displaced rearward at a state where the steering angle ratio adjustment motor collides with the support frame, the auxiliary force applying motor collides with the steering angle ratio adjustment motor.

5. The variable steering angle type steering according to claim 4, wherein an output shaft of the auxiliary force applying device and an output shaft of the steering angle ratio adjustment motor are parallel with each other.

6. The variable steering angle type steering according to claim 4, wherein the steering angle ratio adjustment motor and the auxiliary force applying motor are supported and fixed to a same side of the steering column with respect to the width direction.

7. The variable steering angle type steering according to claim 1, wherein an inclined surface part that is inclined in a rearward direction as the inclined surface part faces outward in the width direction is provided at a part positioned at a side forward of the steering angle ratio adjustment motor and fixed with respect to the steering angle ratio adjustment motor.

8. The variable steering angle type steering device according to claim 1, further comprising a steering lock device configured to substantially prevent the first rotating shaft and the second rotating shaft from rotating at an inner diameter-side of the steering column upon operation, wherein the steering lock device comprises:

a through-hole formed at the steering column;

an engaging concave portion formed directly or via another member at a position at which the engaging concave portion matches the through-hole in the axial direction at a part of one of the first rotating shaft and the second rotating shaft;

a locking pin provided to be displaceable in the through-hole in a radial direction of the steering column; and an actuator for displacing the locking pin in the radial direction of the steering column, wherein rotations of the first rotating shaft and the second rotating shaft relative to the steering column are substantially prevented by displacing the locking pin toward a radially inner side by the actuator and engaging a tip portion of the locking pin with the engaging concave portion, wherein rotations of the first rotating shaft and the second rotating shaft relative to the steering column are permitted by displacing the locking pin toward a radially outer side by the actuator and releasing an engagement between the tip portion of the locking pin and the engaging concave portion, wherein the actuator is supported and fixed to a same side as the steering angle ratio adjustment motor with respect to the width direction at a part of the steering column forward of a part at which the steering column is supported with respect to the support frame, and wherein when one of the steering angle ratio adjustment motor and the actuator tends to be further displaced rearward at a state where the other of the steering angle ratio adjustment motor and the actuator collides with the support frame upon the primary collision, the one of the steering angle ratio adjustment motor and the actuator collides with the other of the steering angle ratio adjustment motor and the actuator.

9. A variable steering angle type steering comprising:

a steering column which comprises a cylindrical shape and is supported to a support frame disposed in a width direction of a vehicle body;

a first rotating shaft which is rotatably supported in the steering column and is configured to be rotated by a steering wheel fixed to a rear end portion of the first rotating shaft;

a second rotating shaft which is provided concentrically with the first rotating shaft and is configured to apply a steering angle to steered wheels in association with rotation;

a transmission which is a differential transmission provided between the first rotating shaft and the second rotating shaft and configured to connect the first rotating shaft and the second rotating shaft so that a rotating force can be transmitted; and a steering angle ratio adjustment motor which is supported and fixed with respect to the steering column and is provided to rotate a rotational element configuring the transmission, wherein the rotational element is rotated by the steering angle ratio adjustment motor, so that a relationship between an amount of rotation of the first rotating shaft and an amount of rotation of the second rotating shaft is changed, and a relationship between an amount of steering of the steering wheel and an amount of change in steering angle is changed, wherein the steering angle ratio adjustment motor is supported and fixed to a part of the steering column forward of a part at which the steering column is supported to the support frame, wherein upon primary collision, the steering angle ratio adjustment motor collides with the support frame, and the steering angle ratio adjustment motor is prevented from being displaced rearward beyond the support frame, further comprising a steering lock device configured to substantially prevent the first rotating shaft and the second rotating shaft from rotating at an inner diameter-side of the steering column upon operation, wherein the steering lock device comprises:

a through-hole formed at the steering column;

an engaging concave portion formed directly or via another member at a position at which the engaging concave portion matches the through-hole in the axial direction at a part of one of the first rotating shaft and the second rotating shaft;

a locking pin provided to be displaceable in the through-hole in a radial direction of the steering column; and an actuator for displacing the locking pin in the radial direction of the steering column, wherein rotations of the first rotating shaft and the second rotating shaft relative to the steering column are substantially prevented by displacing the locking pin toward a radially inner side by the actuator and engaging a tip portion of the locking pin with the engaging concave portion, wherein rotations of the first rotating shaft and the second rotating shaft relative to the steering column are permitted by displacing the locking pin toward a radially outer side by the actuator and releasing an engagement between the tip portion of the locking pin and the engaging concave portion, wherein the actuator is supported and fixed to a same side as the steering angle ratio adjustment motor with respect to the width direction at a part of the steering column forward ofthan a part at which the steering column is supported with respect to the support frame, and wherein when one of the steering angle ratio adjustment motor and the actuator tends to be further displaced rearward at a state where the other of the steering angle ratio adjustment motor and the actuator collides with the support frame upon the primary collision, the one of the steering angle ratio adjustment motor and the actuator collides with the other of the steering angle ratio adjustment motor and the actuator.

* * * * *